(12) United States Patent
Boileau (10) Patent No.: US 11,944,068 B2
(45) Date of Patent: Apr. 2, 2024

(54) ADJUSTABLE DOG TOY

(71) Applicant: Geoffrey Boileau, Greenwith (AU)

(72) Inventor: Geoffrey Boileau, Greenwith (AU)

(*) Notice: Subject to any disclaimer, the term of this patent is extended or adjusted under 35 U.S.C. 154(b) by 253 days.

(21) Appl. No.: 17/200,517

(22) Filed: Mar. 12, 2021

(65) Prior Publication Data
US 2021/0282373 A1    Sep. 16, 2021

Related U.S. Application Data

(60) Provisional application No. 62/988,887, filed on Mar. 12, 2020.

(51) Int. Cl.
*A01K 15/02* (2006.01)
*A63F 9/06* (2006.01)

(52) U.S. Cl.
CPC .......... *A01K 15/025* (2013.01); *A63F 9/0601* (2013.01)

(58) Field of Classification Search
CPC .... A01K 15/025; A01K 15/026; A01K 15/02; A01K 5/0275; A01K 5/0225; A01K 5/01; A01K 39/01; A01K 39/012; A63F 9/0601; A63H 33/062; A63H 33/101; A63H 33/065; A63H 33/06; A63H 33/102; A63H 33/084; A63H 33/108
USPC ................. 119/707, 708, 709, 702
See application file for complete search history.

(56) References Cited

U.S. PATENT DOCUMENTS

| | | | |
|---|---|---|---|
| 6,264,522 B1 * | 7/2001 | Dickson | A44C 13/00 446/124 |
| 8,474,404 B2 | 7/2013 | Costello | |
| 8,516,977 B2 | 8/2013 | Shatoff et al. | |
| 9,004,012 B2 | 4/2015 | Taylor | |
| 10,111,407 B2 | 10/2018 | Axelrod et al. | |
| 2004/0200434 A1 * | 10/2004 | Shatoff | A01K 5/00 119/707 |
| 2005/0197039 A1 * | 9/2005 | Bentley, Jr. | A63H 33/062 446/125 |

(Continued)

FOREIGN PATENT DOCUMENTS

| | | | | |
|---|---|---|---|---|
| WO | WO-2007085207 A2 * | 8/2007 | ........... | A63H 33/062 |
| WO | WO 2009/039153 | 3/2009 | | |
| WO | WO 2017/137598 | 8/2017 | | |

OTHER PUBLICATIONS https://k9connectables.com, author unknown, date unknown.

(Continued)

*Primary Examiner* — Jeffrey R Larsen (57) ABSTRACT

A dog toy comprises a first component having a body that defines a cavity, the body having an opening into the cavity. The dog toy also comprises a second component having a body comprising a first protrusion and a second protrusion. Each of the first protrusion and the second protrusion is selectively insertable into the first component opening in a manner where it remains within the opening to close the opening and is removable from the first component opening when a separation force is applied. The separation force for the first protrusion is different than the separation force for the second protrusion. A treat can be inserted into the first component cavity, the first component cavity can be closed by insertion of the first protrusion or second protrusion into the first component opening, and a dog can gain access to the treat by separating the first component and the second component.

20 Claims, 7 Drawing Sheets

(56) References Cited

U.S. PATENT DOCUMENTS

| | | | |
|---|---|---|---|
| 2006/0276100 A1* | 12/2006 | Glickman | A63H 33/101 |
| | | | 446/120 |
| 2007/0077854 A1* | 4/2007 | Jeon | A63H 33/065 |
| | | | 446/122 |
| 2014/0202396 A1 | 7/2014 | Hansen | |
| 2017/0157523 A1* | 6/2017 | Jabr | A63H 33/048 |
| 2019/0000040 A1* | 1/2019 | McIlvenna | A01K 15/026 |

OTHER PUBLICATIONS https://dgliangyu.en.alibaba.com/product/60746565775-803787405/injection_eva_foam_toys_for_kids.html?spm=a2700.icbuShop.41413.38.357b3e0dM3pfbp, author unknown, date unknown.

https://outwardhound.com/buzzwoof/product/let-games-begin, author unknown, date unknown.

https://gooddogsco.com/best-dog-puzzle-toys, author unknown, date unknown.

https://www.shopdogandco.com/products/my-intelligent-pets-sudoku-puzzle-game, author unknown, date unknown.

\* cited by examiner

ADJUSTABLE DOG TOY

PRIORITY

The present application claims the benefit of domestic priority based on United States Provisional Patent Application 62/988,887 filed on Mar. 12, 2020, the entirety of which is incorporated herein by reference.

BACKGROUND

A dog loves a treat and a toy above all things, aside from its owner.

Providing a dog with a toy can help pacify and calm the dog. This can be especially true when a dog must be left alone for a long period of time. Many dogs have separation anxiety when not in the company of their owner, and this anxiety often results in destructive behavior. It is not unusual for an owner to return home to a mess, an accident, and/or valuable items chewed or otherwise damaged or destroyed.

An owner will often leave behind or scatter dog toys when going away in hopes that the toys will occupy the dog and prevent destructive behavior. However, dogs often lose interest in a toy after a period of time, and it sometimes does not take long for the dog to move along to something new. In many cases, this results in destruction or loss.

There is therefore a need for an improved dog toy. There is further a need for a dog toy that can provide a reward to a dog. There is a further need for a dog toy that can provide a reward to a dog and encourage a longer period of attention. There is further a need for a dog toy that can provide a reward to a dog and that is adjustable.

SUMMARY

The present invention satisfies these needs. In one aspect of the invention, an improved dog toy is provided.

In another aspect of the invention, a dog toy is provided that can provide a reward to a dog in response to a selected amount of effort by the dog.

In another aspect of the invention, a dog toy can provide a reward to a dog and can encourage a longer period of attention or pacification.

In another aspect of the invention, a dog toy is provided that can provide an award to a dog in an adjustable manner.

In another aspect of the invention, a dog toy is provided that can be configured into a variety of shapes and that can contain one or more rewards.

In another aspect of the invention, a dog toy is provided that can be configured into a variety of shapes, wherein the shape can contain multiple rewards and wherein the task required to achieve each reward is adjustable.

In another aspect of the invention, a dog toy comprises a first component having a first component body that defines cavity, the body having an opening into the cavity and a second component having a second component body. The second component body comprises a first protrusion selectively insertable into the opening in a manner where it remains within the opening to close the opening and being removable from the opening when a first separation force is applied. The second component further comprising a second protrusion selectively insertable into the opening in a manner where it remains within the opening to close the opening and being removable from the opening when a second separation force is applied, wherein the second separation force being different than the first separation force.

In another aspect of the invention, a dog toy comprises a first component having a first component body that defines a first component cavity, the first component body having a first component opening into the first component cavity; and a second component having a second component body, the second component body comprising a first protrusion and a second protrusion, wherein each of the first protrusion and the second protrusion is selectively insertable into the first component opening in a manner where it remains within the first component opening to close the first component opening and is removable from the first component opening when a separation force is applied, wherein the separation force for the first protrusion is different than the separation force for the second protrusion, whereby a treat can be inserted into the first component cavity, the first component cavity can be closed by insertion of the first protrusion or second protrusion into the first component opening, and a dog can gain access to the treat by separating the first component and the second component.

In another aspect of the invention, a dog toy comprises a first component having a first component body that defines a first component cavity, the first component body having a first component opening into the first component cavity; and a second component having a second component body, the second component body comprising a first protrusion and a second protrusion, wherein each of the first protrusion and the second protrusion is selectively insertable into the first component opening in a manner where it remains within the first component opening to close the first component opening and is removable from the first component opening when a separation force is applied, wherein the separation force for the first protrusion is different than the separation force for the second protrusion, whereby a treat can be inserted into the first component cavity, the first component cavity can be closed by insertion of the first protrusion or second protrusion into the first component opening, and a dog can gain access to the treat by separating the first component and the second component, wherein the first protrusion comprises a shaft portion and a knob portion, the shaft portion having a cross-sectional dimension the same as or less than a cross-sectional dimension of the first component opening and the knob portion having a cross-sectional dimension larger than the cross-sectional dimension of the first component opening.

In another aspect of the invention, a dog toy comprises a first component having a first component body that defines a first component cavity, the first component body having a first component opening into the first component cavity; and a second component having a second component body, the second component body comprising a first protrusion and a second protrusion, wherein each of the first protrusion and the second protrusion is selectively insertable into the first component opening in a manner where it remains within the first component opening to close the first component opening and is removable from the first component opening when a separation force is applied, wherein the separation force for the first protrusion is different than the separation force for the second protrusion, whereby a treat can be inserted into the first component cavity, the first component cavity can be closed by insertion of the first protrusion or second protrusion into the first component opening, and a dog can gain access to the treat by separating the first component and the second component, wherein the first protrusion comprises a shaft portion and a knob portion, the shaft portion of the first protrusion having a cross-sectional dimension less than a cross-sectional dimension of the knob portion of the first protrusion, and wherein the second protrusion comprises a shaft portion and a knob portion, the shaft portion of the second protrusion having a cross-sectional dimension less than a cross-sectional dimension of the knob portion of the second protrusion.

In another aspect of the invention, a dog toy comprises a first component having a first component body that defines a first component cavity, the first component body having a first component opening into the first component cavity; and a second component having a second component body, the second component body comprising a first protrusion and a second protrusion, wherein each of the first protrusion and the second protrusion is selectively insertable into the first component opening in a manner where it remains within the first component opening to close the first component opening and is removable from the first component opening when a separation force is applied, wherein the separation force for the first protrusion is different than the separation force for the second protrusion, whereby a treat can be inserted into the first component cavity, the first component cavity can be closed by insertion of the first protrusion or second protrusion into the first component opening, and a dog can gain access to the treat by separating the first component and the second component, wherein the first protrusion comprises a shaft portion and a knob portion, the shaft portion of the first protrusion having a cross-sectional dimension less than a cross-sectional dimension of the knob portion of the first protrusion, wherein the second protrusion comprises a shaft portion and a knob portion, the shaft portion of the second protrusion having a cross-sectional dimension less than a cross-sectional dimension of the knob portion of the second protrusion, and wherein the cross-sectional dimension of the knob portion of the first protrusion is different than the cross-sectional dimension of the knob portion of the second protrusion.

In another aspect of the invention, a dog toy comprises a first component having a first component body that defines a first component cavity, the first component body having a first component opening into the first component cavity; and a second component having a second component body, the second component body comprising a first protrusion and a second protrusion, wherein each of the first protrusion and the second protrusion is selectively insertable into the first component opening in a manner where it remains within the first component opening to close the first component opening and is removable from the first component opening when a separation force is applied, wherein the separation force for the first protrusion is different than the separation force for the second protrusion, whereby a treat can be inserted into the first component cavity, the first component cavity can be closed by insertion of the first protrusion or second protrusion into the first component opening, and a dog can gain access to the treat by separating the first component and the second component, wherein the second component has a second component cavity and a second component opening into the second component cavity, and wherein the first component comprises one or more protrusions each insertable into the second component opening to close the second component cavity.

In another aspect of the invention, a dog toy comprises a first component having a first component body that defines a first component cavity, the first component body having a first component opening into the first component cavity; and a second component having a second component body, the second component body comprising a first protrusion and a second protrusion, wherein each of the first protrusion and the second protrusion is selectively insertable into the first component opening in a manner where it remains within the first component opening to close the first component opening and is removable from the first component opening when a separation force is applied, wherein the separation force for the first protrusion is different than the separation force for the second protrusion, whereby a treat can be inserted into the first component cavity, the first component cavity can be closed by insertion of the first protrusion or second protrusion into the first component opening, and a dog can gain access to the treat by separating the first component and the second component, wherein the first and second components are substantially the same.

In another aspect of the invention, a dog toy comprises a component having a body that defines a cavity, the body having: an opening into the cavity; a first protrusion comprising a shaft portion and a knob portion, the shaft portion of the first protrusion having a cross-sectional dimension less than a cross-sectional dimension of the knob portion of the first protrusion; and a second protrusion comprising a shaft portion and a knob portion, the shaft portion of the second protrusion having a cross-sectional dimension less than a cross-sectional dimension of the knob portion of the second protrusion, wherein the cross-sectional dimension of the knob portion of the first protrusion is different than the cross-sectional dimension of the knob portion of the second protrusion.

In another aspect of the invention, a dog toy comprises a component having a body that defines a cavity, the body having: an opening into the cavity; a first protrusion comprising a shaft portion and a knob portion, the shaft portion of the first protrusion having a cross-sectional dimension less than a cross-sectional dimension of the knob portion of the first protrusion; and a second protrusion comprising a shaft portion and a knob portion, the shaft portion of the second protrusion having a cross-sectional dimension less than a cross-sectional dimension of the knob portion of the second protrusion, wherein the cross-sectional dimension of the knob portion of the first protrusion is different than the cross-sectional dimension of the knob portion of the second protrusion, wherein the component is cuboidal and has six faces, wherein the opening is provided on one of the faces, the first protrusion is provided on another one of the faces, and the second protrusion is provided on another one of the faces.

In another aspect of the invention, a method of providing a dog with a treat comprises providing a first component having a first component body that defines a first component cavity, the first component body having a first component opening into the first component cavity; providing a second component having a second component body, the second component body comprising a first protrusion and a second protrusion, wherein each of the first protrusion and the second protrusion is selectively insertable into the first component opening in a manner where it remains within the first component opening to close the first component opening and being removable from the first component opening when a separation force is applied, wherein the separation force for the first protrusion is different than the separation force for the second protrusion; inserting a treat into the first component cavity; selecting either then first protrusion or the second protrusion based on a desired relative separation force; inserting the selected first protrusion or second protrusion into the first component opening to close the first component cavity and retain the treat therein until a separation force is achieved.

In another aspect of the invention, a method of providing a dog with a treat comprises providing a first component having a first component body that defines a first component cavity, the first component body having a first component opening into the first component cavity; providing a second component having a second component body, the second component body comprising a first protrusion and a second protrusion, wherein each of the first protrusion and the second protrusion is selectively insertable into the first component opening in a manner where it remains within the first component opening to close the first component opening and being removable from the first component opening when a separation force is applied, wherein the separation force for the first protrusion is different than the separation force for the second protrusion; inserting a treat into the first component cavity; selecting either then first protrusion or the second protrusion based on a desired relative separation force; inserting the selected first protrusion or second protrusion into the first component opening to close the first component cavity and retain the treat therein until a separation force is achieved, wherein the second component has a second component cavity and a second component opening into the second component cavity, the method further comprising: providing a third component having a first protrusion and a second protrusion; inserting a treat into the second component cavity; and closing the second component cavity by inserting the first protrusion or second protrusion of the third component into the second component opening.

DRAWINGS

These features, aspects, and advantages of the present invention will become better understood with regard to the following description, appended claims, and accompanying drawings which illustrate exemplary features of the invention. However, it is to be understood that each of the features can be used in the invention in general, not merely in the context of the particular drawings, and the invention includes any combination of these features, where:

DESCRIPTION

The present invention relates to a dog toy. In particular, the invention relates to a dog toy that can reward a dog in a selectable manner and/or for continued persistence or pacification. Although the dog toy is illustrated and described in the context of being useful for dogs, the present invention can be useful in other instances. Accordingly, the present invention is not intended to be limited to the examples and embodiments described herein.

Figure 1A:
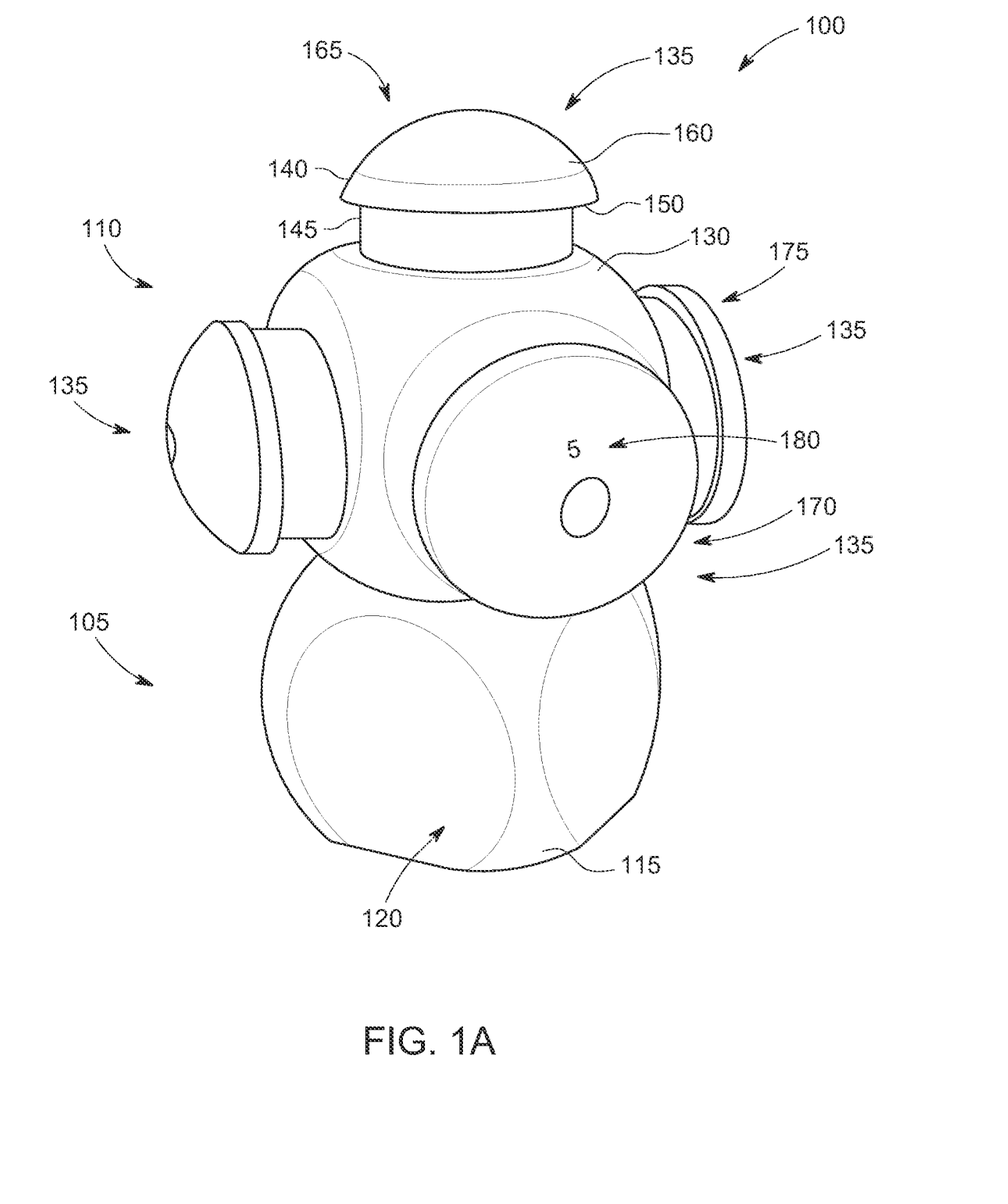
FIG. 1A is a schematic perspective view of a dog toy according to the invention in an assembled configuration.

FIG. 1A shows a dog toy 100 having a first component 105 detachably connected to a second component 110. The first component 105, shown detached in FIG. 1B, includes a first component body 115. The first component body 115 includes a hollow portion that defines a first component cavity 120 within the interior of the first component body 115. A first component opening 125 is provided in the first component body 115. The first component opening 125 provides access to the first component cavity 120. The second component 110, shown detached in FIG. 1C, includes a second component body 130 having one or more second component protrusions 135 extending from the second component body 130. The one or more second component protrusions 135 each include a knob portion 140 connected to the second component body 130 by a shaft portion 145.

Figure 1B:
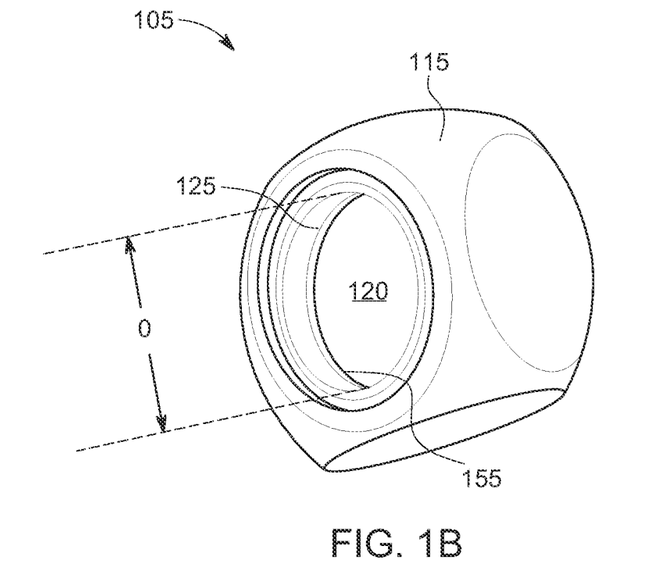
FIG. 1B is a schematic perspective view of a first component of the dog toy of FIG. 1A.
Figure 1C:
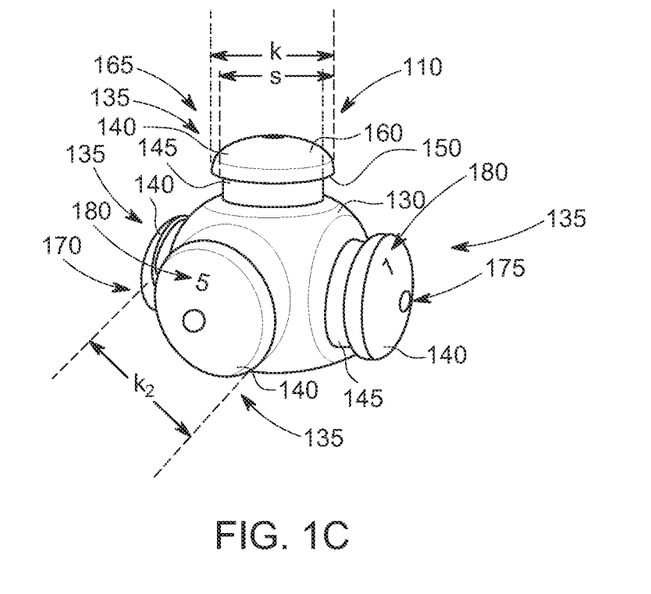
FIG. 1C is a schematic perspective view of a second component of the dog toy of FIG. 1A.

The dog toy 100 can be assembled by connecting the first component 105 and the second component 110. A second component protrusion 135 is insertable into the first component opening 125 in a male/female relationship, respectively. As can be seen in FIG. 1B, the first component opening 125 into the first component cavity 120 has a cross-sectional dimension, o. As can be seen in FIG. 1C, the shaft portion 145 of the protrusion 135 of the second component 110 is recessed relative to the knob portion 140 so that the shaft portion 145 has a transverse cross-sectional dimension, s, that is less than the corresponding transverse cross-sectional dimension, k of the knob portion 140. The shaft portion transverse cross-sectional dimension, s, is equal to or less than the first component opening dimension, o, and the knob dimension, k, is larger than the first component opening dimension, o. Thus, when assembled, the knob 140 resides in the first component cavity 120, and a lip 150 of the knob portion 140 formed at the juncture of the knob portion 140 and the recessed shaft portion 145 contacts a rim 155 on the interior of the first component 105 at the first component opening 125 to retain the protrusion 135 within the first component opening 125.

To disassemble the dog toy 100, the first component 105 and the second component 110 are pulled apart with a separation force. By separation force it is meant the required or minimum force that is sufficient to cause the knob portion 145 to squeeze or pass through the first component opening 125. The separation force can be a tensile force, a transverse force that causes deformation of the parts, any other force that causes separation, or a combination of these forces. Normally, when a dog is trying to separate the components a combination of pulling and deformation from biting will be used. The magnitude of the necessary separation force will depend on the difference between the cross-sectional dimension, k, of the knob 140 and the dimension, o, of the first component opening 125. The greater the difference between the two dimensions, the larger the separation force. The magnitude of the separation force will also depend on the deformability of the material of the protrusion 135 and the first component body 115 in the area when the first component opening 125 is defined. The less deformable the material, the larger the separation force need to disconnect the first component 105 from the second component 110. In one version, the protrusion 135 and/or the first component body 115 comprise a deformable plastic material, such as a thermoplastic elastomer such as thermoplastic rubber (TPR). Alternatively, the protrusion 135 and/or the first component body 115 can comprise one or more of natural rubber, synthetic rubber, mixtures thereof, and the like.

In use, the dog toy 100 can be used to pacify a dog or other animal. A treat or other aromatic material can be inserted into the first component cavity 120, and then the second component 110 can be connected to the first component by inserting a protrusion 135 of the second component 110 into the first component opening 125. The knob portion 140 can optionally include a tapering forward surface 160 to help facilitate the insertion of the knob portion 140 into the first component opening 125. Once connected, the dog will smell the treat in the first component cavity 120 and will try to get to the treat. To do so, the dog will have to separate the second component 110 from the first component 105 to gain access to the first component cavity 120 and the treat therein. The separation force needed to disconnect the second component 110 from the first component 105 can be selected based on one or more of several factors, such as the size, strength and activity level of the dog and the amount of time an owner or supervisor wants the dog to be pacified. For example, a very low required separation force will provide near immediate gratification to the dog whereas a very large required separation force can keep a dog occupied for a long period of time. That which constitutes a very low and a very large separation force will depend on the size, strength, and activity level of the dog.

In one version, such as shown in FIGS. 1A through 1C, the dog toy 100 can have an adjustable or selectable separation force that is need for separation of the connected components. For example, the second component 110 can have a plurality of protrusions 135 including a first protrusion 165 having an associated first separation force and a second protrusion 170 having an associated second separation force. By making the first separation force different than the second separation force, a user can select which separation force is desired for the dog toy 100. In the version of FIGS. 1A through 1C, the different separation forces are provided by providing the second protrusion 170 with a knob portion 140 having a cross sectional dimension, k2, different than the knob dimension, k, of the first protrusion 165. In the particular version shown in FIG. 1C, k2 is larger than k. Accordingly, when the first protrusion 165 and the second protrusion 170 are made out of the same or similar material, a larger separation force will be needed to disconnect the second protrusion 170 from the opening 125 than it would take for the first protrusion 165 if the first protrusion 165 was inserted into the first component opening 125 instead of the second protrusion 170. As also shown in FIG. 1C, optionally, a third protrusion 175 that is different than both the first protrusion 165 and the second protrusion 170 can be provided to provide even more adjustability. Similarly, fourth, fifth, sixth, etc. protrusions can be provided depending on the degree of adjustability desired. Indicia 180 can optionally be provided on the multiple protrusions 135 to provide an indication to the user of the relative range of separation forces.

The dimensions and relative dimensions of the first component opening 125 and a second component protrusion 135 can be selected to provide a desired separation force or a series of desired separation forces. For example, in one version of the dog toy 100 made from thermoplastic rubber, the first component opening 125 can have a cross-sectional dimension, o, ranging in size from about 5 mm to about 100 mm, or from about 15 mm to about 80 mm, or from about 20 mm to about 50 mm. In one particular version, the first component opening 125 is about 25 mm in cross-sectional dimension. In another particular version, the first component opening 125 is about 35 mm in cross-sectional dimension. The second component protrusion 135 dimensions can then be sized and shaped accordingly. For example, the shaft cross-sectional dimension, s, can be equal to or less than the first component opening cross-sectional dimension, o. The knob portion cross-sectional dimension, k, can be equal to or greater than the first component opening cross-sectional dimension, or from about 0 mm to about 40 mm greater than o, or from about 0.5 mm to about 20 mm greater than o, or from about 1 mm to about 10 mm greater than o. In one particular version, for a first component opening having a cross-sectional dimension, o, of mm, the knob cross-sectional dimension, k, can vary from about 26 mm to about 35 mm, and particular versions of second components having one or more knobs 135 with a cross sectional dimension, k, of 6.8 mm, 28.7 mm. 29.5 mm, 30.7 mm, and/or 32.3 mm. In another particular version, for a first component opening having a cross-sectional dimension, o, of 35 mm, the knob cross-sectional dimension can vary from about 35.5 mm to about 50 mm, and particular versions of second components can have one or more knobs 135 with a cross sectional dimension, k, of 36 mm, 39 mm, 40.6 mm, 41.5 mm or 43.5 mm. The above-provided dimensions are based on diametric dimensions for substantially circular cross-sections. For non-circular cross sectional openings and/or knobs, the dimensions would be correspondingly adjusted according to the shape. For example, for an oval or polygon or the like, the above cross sectional dimensions may related to the average cross-sectional distance, the maximum cross-sectional distance, and/or the minimum cross-sectional dimension. Similarly, the dimensions can be adjusted based on material deformability.

For a dog toy 100 having multiple protrusions, the dimensions and relative dimensions of the first component opening 120 and the one or more protrusions 135 can also be selected to provide a desired separation force or a series of desired separation forces. In one version, the multiple protrusions 135 can each have similar sizes and shapes and be dimensioned as discussed above. In another version, different protrusions 135 can have different sizes or shapes so that the separation force associated with each is variable and selected. For example, in one version of the dog toy 100 made from thermoplastic rubber, the first component opening 125 can have a cross-sectional dimension, o, ranging in size from about 5 mm to about 100 mm, or from about 15 mm to about 80 mm, or from about 20 mm to about 50 mm. In one particular version, the first component opening 125 is about 25 mm in cross-sectional dimension. In another particular version, the first component opening 125 is about 35 mm in cross-sectional dimension. The protrusion 135 dimensions can then be sized and shaped accordingly. The knob portion cross-sectional dimension, k, for a first protrusion can be equal to or greater than the opening cross-sectional dimension, or from about 0 mm to about 40 mm greater than o, or from about 0.5 mm to about 20 mm greater than o, or from about 1 mm to about 10 mm greater than o. The second protrusion knob cross-sectional dimension, k2, can have dimensions falling within the above ranges for k, but larger than k. For example, in one version, k can be from about 0.5 mm to about 7 mm greater than o and k2 can be from about 3 mm to about 20 mm greater than o and greater than k. In another version, k can be from about 1 mm to about 5 mm greater than o and k2 can be from about 3 mm to about 10 mm greater than o and greater than k. In another version, k can be from about 1 mm to about 4 mm greater than o and k2 can be from about 4.5 mm to about 10 mm greater than o. In one particular version, for a first component opening 125 having a cross-sectional dimension, o, of 25 mm, the first knob cross-sectional dimension, k, and the second knob cross sectional dimension, k2, can each vary from about 26 mm to about 35 mm and be different from one another. For example, knobs 140 can have two or more of the cross sectional dimensions, k, k2, etc. selected from 26.8 mm, 28.7 mm. 29.5 mm, 30.7 mm, or 32.3 mm. In another particular version, for an opening having a cross-sectional dimension, o, of 35 mm, the first knob cross-sectional dimension, k, and the second knob cross sectional dimension, k2, can each vary from about mm to about 50 mm. For example, knobs 135 can have two or more of the cross sectional dimensions, k, k2, etc. selected from 36 mm, 39 mm, 40.6 mm, 41.5 mm or 43.5 mm. The above-provided dimensions are based on diametric dimensions for substantially circular cross-sections. For non-circular cross sectional openings and/or knobs, the dimensions would be correspondingly adjusted according to the shape. For example, for an oval or polygon or the like, the above cross sectional dimensions may related to the average cross-sectional distance, the maximum cross-sectional distance, and/or the minimum cross-sectional dimension. Similarly, the dimensions can be adjusted based on material deformability.

Alternatively, the variation in separation strength can be provided in another manner. For example, in one version, the first protrusion 165 can be made of a first material, and the second protrusion 170 can be made of a second material that is less deformable than the first material. In another version, the shape of the knob portion 140 and/or the lip 150 can be selected to provide a range of separation forces. For example, the lip 150 of the first protrusion 165 can be provided with a taper and the lip 150 of the second protrusion 170 can be provided with a steeper taper or no taper to make the separation force of the second protrusion 170 greater than the first protrusion 165. In another version, the differences in separation strength can be provided by having the protrusions and openings have different mating shapes, such as a square shape being inserted into a circular opening, or by providing a keying relationship where disconnection can be achieved by proper relative orientation of a protrusion in an opening. Alternatively still, the differences in separation strength can be achieved by providing notches or the like along the periphery of the knob portions with the size of the notches being different for each protrusion.

Figure 2A:
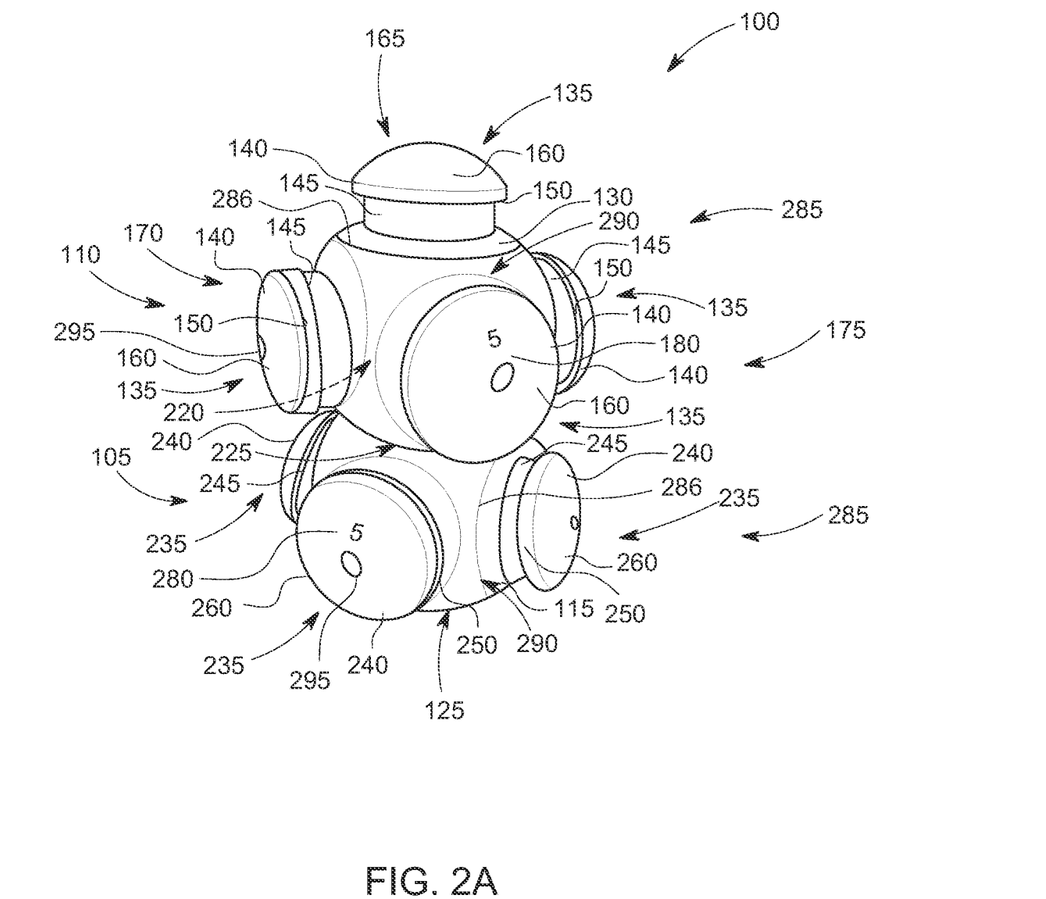
FIG. 2A is a schematic perspective view of another version of a dog toy according to the invention in an assembled configuration.
Figure 2B:
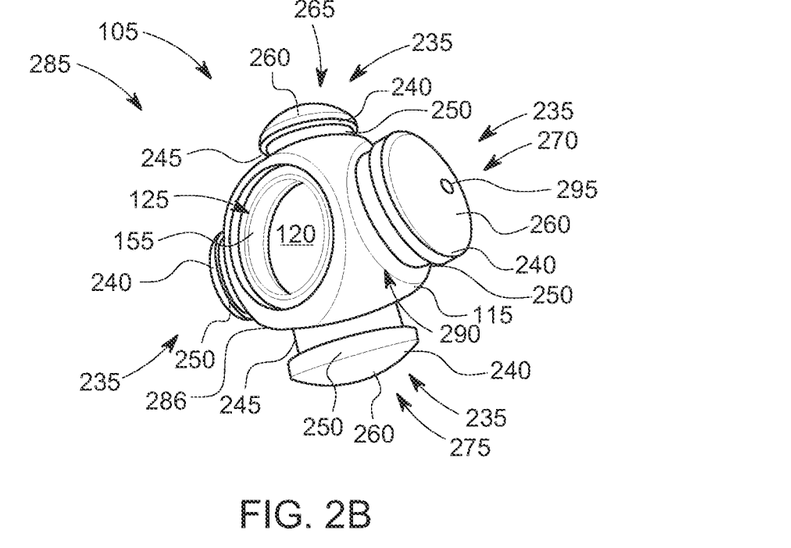
FIG. 2B is a schematic perspective view of a first component of the dog toy of FIG. 2A.
Figure 2C:
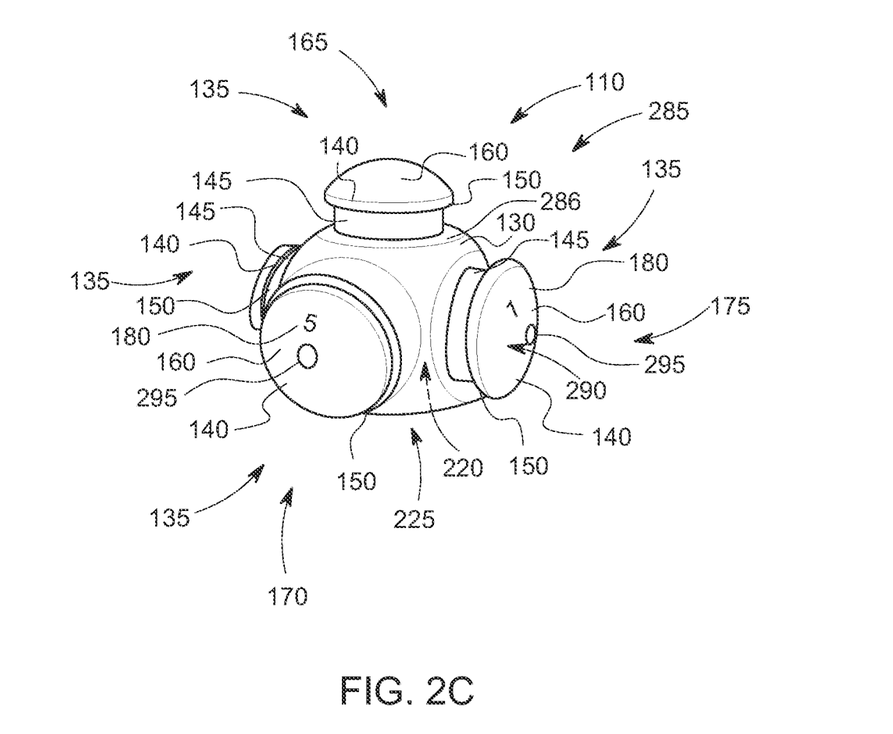
FIG. 2C is a schematic perspective view of a second component of the dog toy of FIG. 2A.

Another version of the dog toy 100 of the invention is shown in FIGS. 2A through 2C. In this version, both the first component 105 and the second component 110 contain a cavity, an opening into the cavity, and one or more protrusions. More specifically, as can be seen, the first component 105, in addition to a first component cavity 120 and first component opening 125 can have one or more first component protrusions 235 which may be the same as or different than the one or more protrusions 135 on the second component 110. The one or more first component protrusions 235 can also each include a first component knob portion 240, a first component shaft portion 245, and a first component lip 250 which can be similar to or different than the knob portion 140, shaft portion 145, and lip 150 of the second component 110, including having cross-sectional dimensions similar those associated with the second component 110. The first component 105 may also include a first component tapering forward surface 260 similar to the tapering forward surface 160 of the second component 110. The one or more first component protrusions 235 can also be a first component first protrusion 265, a first component second protrusion 270, and/or a first component third protrusion 270 similar to first protrusion 165, second protrusion, 170, and third protrusion 175 of the second component 110. FIG. 2A shows an assembled dog toy 100 with one of the protrusions 235 of the first component 105 inserted into the opening 225 of the second component 110. There may be a plurality of protrusions 235 provided on the first component 105 and/or a plurality of protrusions 135 on the second component 110, and the plurality of protrusions 135, 235 can be same or can be different protrusions 135,235, such as shown with a first protrusion 165, 265 a second protrusion 170,270 and a third protrusion 175,275, each of which are associated with a different separation force.

In a particular version, such as shown in FIGS. 2A through 2C, the first component 105 and the second component 110 may each be in the form of a block 285 and may each have the same or substantially the same shape. For example, each of the first component 105 and the second component 110 can be a block 285 having a cuboidal body 286 having six sides. Five of the sides can have a protrusion 135,235 extending from the surface of the side of the cuboidal body 286, and the sixth side can have the opening 125,225 into the cavity 120,220. The protrusions 135,235 extending from each of the five sides can be the same or can be associated with different separation forces. The cuboidal body 286 may optionally be provided with a textured surface 290 over at least a portion of the cuboidal body 286 to aid in gripping the dog toy 100. Also, one or more small holes 295 can be provided to help allow aromas from items in the cavity 120,220 to more easily escape. In the version shown, the small holes 295 are provided on one or more of the knob portions 140,240.

Since there is a cavity 120 in the first component 105 and a cavity 220 in the second component 110 in the version of FIGS. 2A through 2C, a treat or other enticement, can be placed in either cavity 120,220. For example, a user can place a treat into the cavity 220 in the second component 110 and can then attach the first component 105 to the second component 110 by inserting one of the protrusions 235 of the first component 105 into the opening 225 of the second component 110 to simultaneously connect the components and to close the opening 225 of the second component 110 thereby securing the treat in the second component cavity 220. The user can then give the dog toy 100 to a dog or other animal so that the dog can be enticed to try to separate the first component 105 from the second component 110 to obtain the treat. The user can adjust the desired separation force necessary by selecting the appropriate protrusion 235. Alternatively, the user can place the treat in the first component 105 and then attach the second component 110 to the first component 105 in similar manner. A user may also choose to place a treat in both the cavity 120 of the first component 105 and the cavity 220 of the second component 110. One of the cavities will be closed by a protrusion from the other component, and one of the cavities will be open. This can provide the dog with an instant or easier reward and can give the dog an enticing taste of the additional treat that can be obtained from the other cavity with some effort.

Figure 3A:
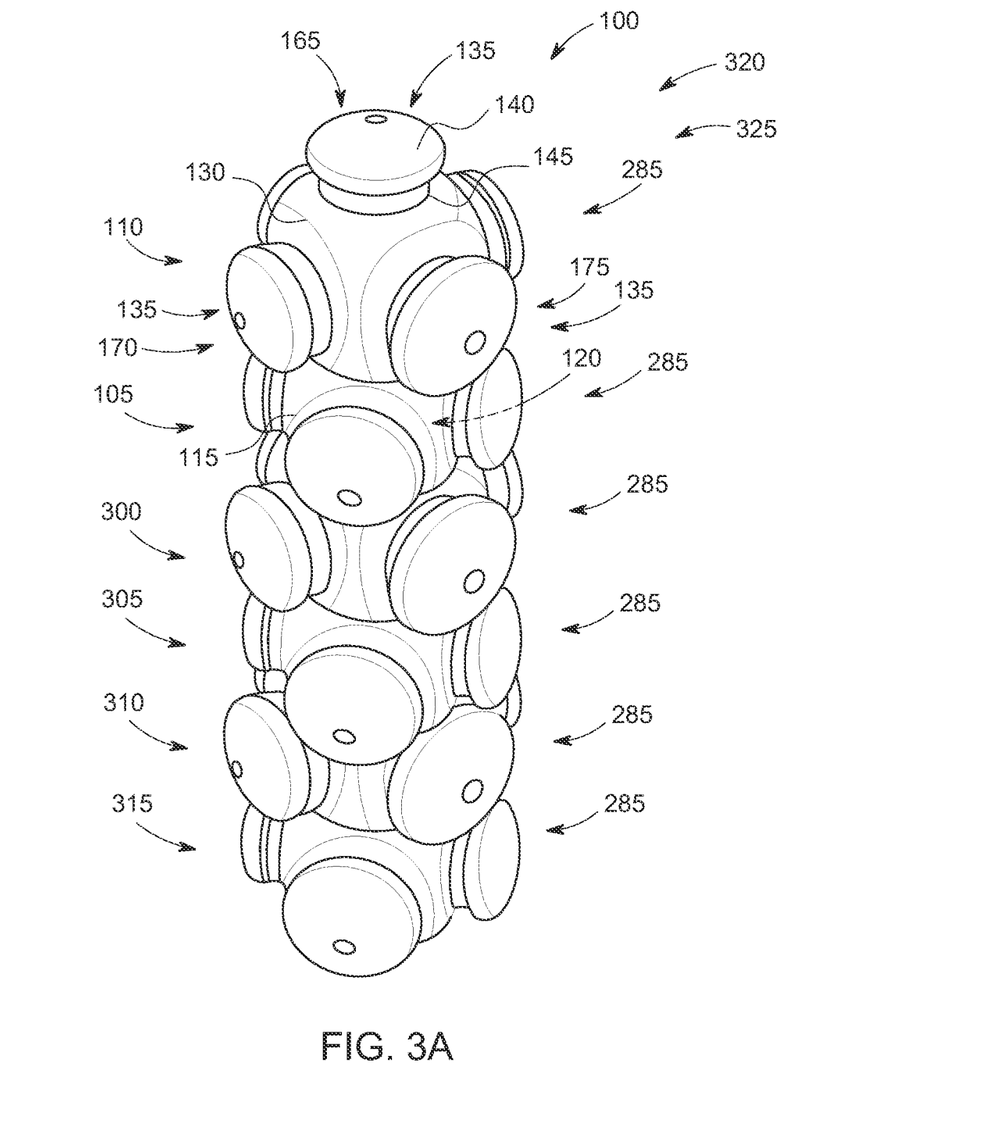
FIG. 3A is a schematic perspective view of a version of the dog toy of the invention having three or more components and being in a first configuration.
Figure 3B:
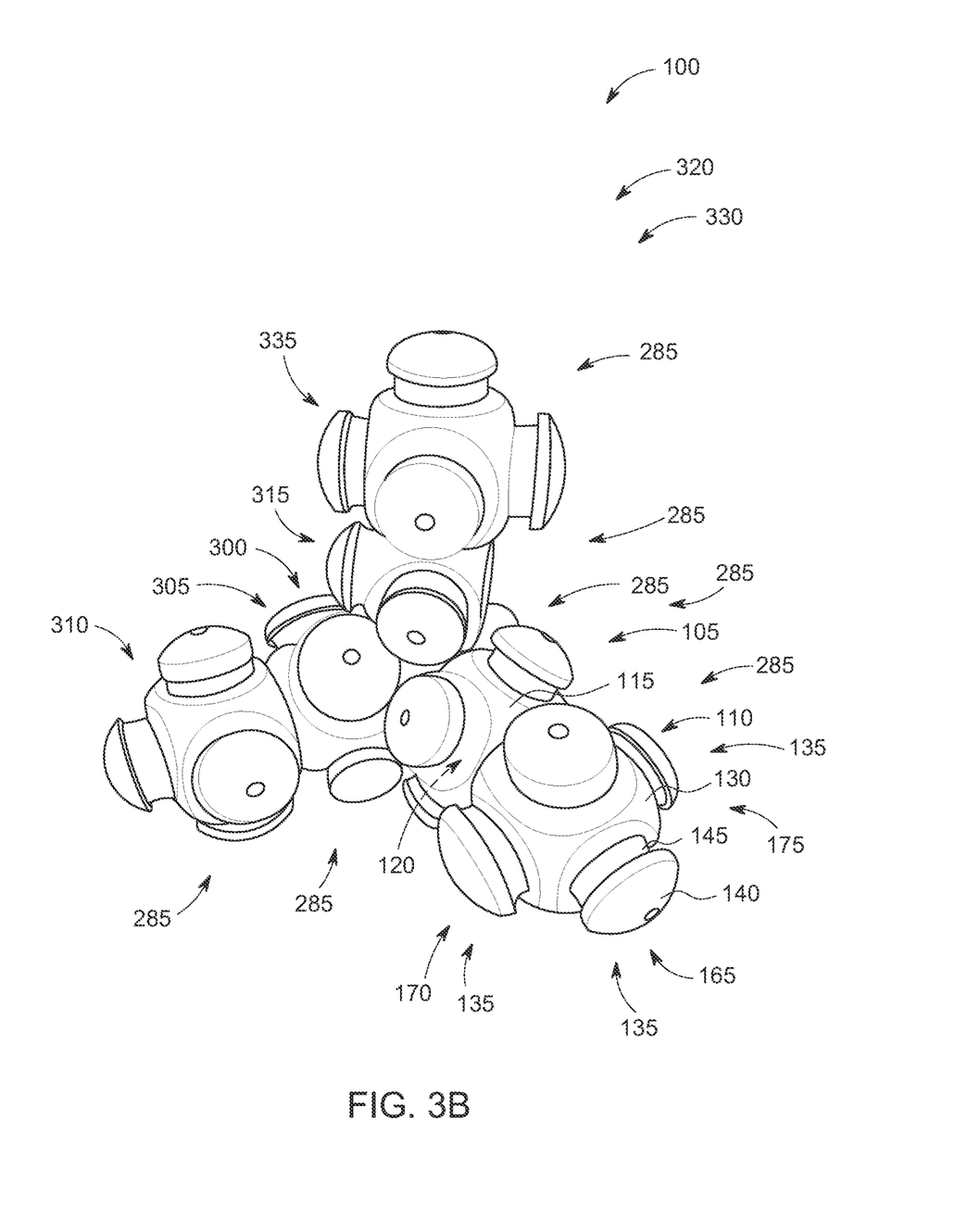
FIG. 3B is a schematic perspective view of the dog toy of FIG. 3A in a second configuration.

Another version of the dog toy 100 is shown in FIGS. 3A and 3B. In this version, the dog toy is made up of three or more blocks 200 so that each block 285 constitutes a first component 105, a second component 110, and a third component 300. In the particular version of FIGS. 3A and 3B, blocks 285 are also provided to make up a fourth component 305, a fifth component 310, and a sixth component 315. Any number of addition or fewer blocks can be provided. By using three or more blocks 285 in the version of FIGS. 3A and 3B, the blocks 285 can be connected to one another to form a dog toy 100 in conglomerated form 320. By conglomerated form it is meant three or more blocks 285 that are connected to one another in a manner that allows the dog toy 100 to carried and/or played with as a single unit and allows for the disconnection of one or more of the blocks 285 so that the dog toy 100 becomes multiple units. For example, the conglomerated form 320 can be in the shape of a tower 325, as shown in FIG. 3A, where the blocks 285 are connected along a single axis. Alternatively, the blocks 285 can be connected along multiple axes, such as the multiple axes shape 330, such as shown in FIG. 3B, which further includes a seventh component 335, and which shows the blocks 285 connected along three axes.

Figure 4A:
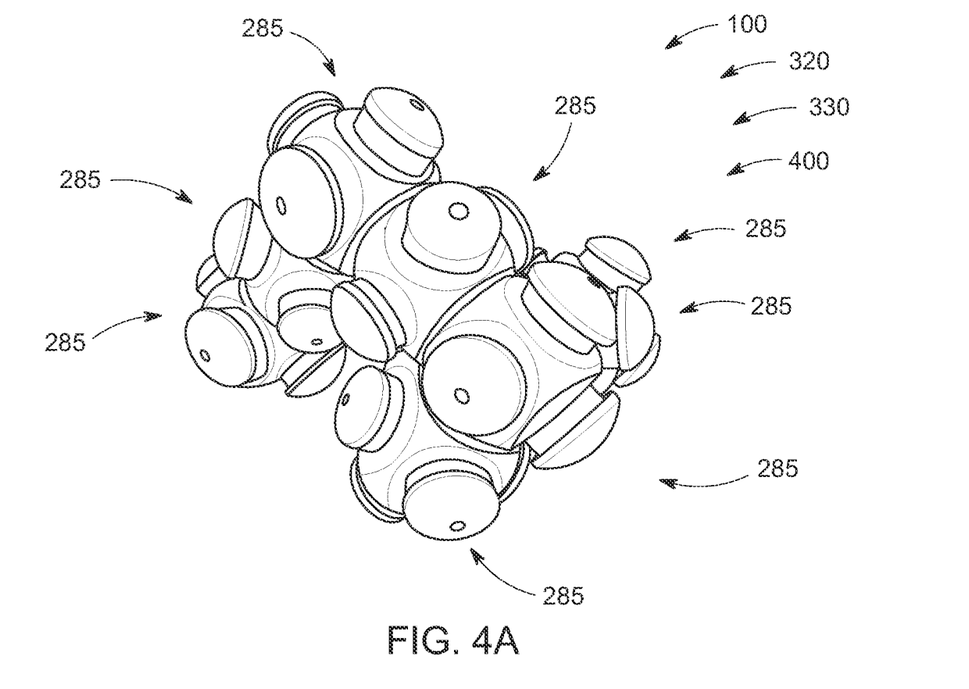
FIG. 4A is a schematic perspective view of the dog toy of FIG. 3A in a third configuration.
Figure 4B:
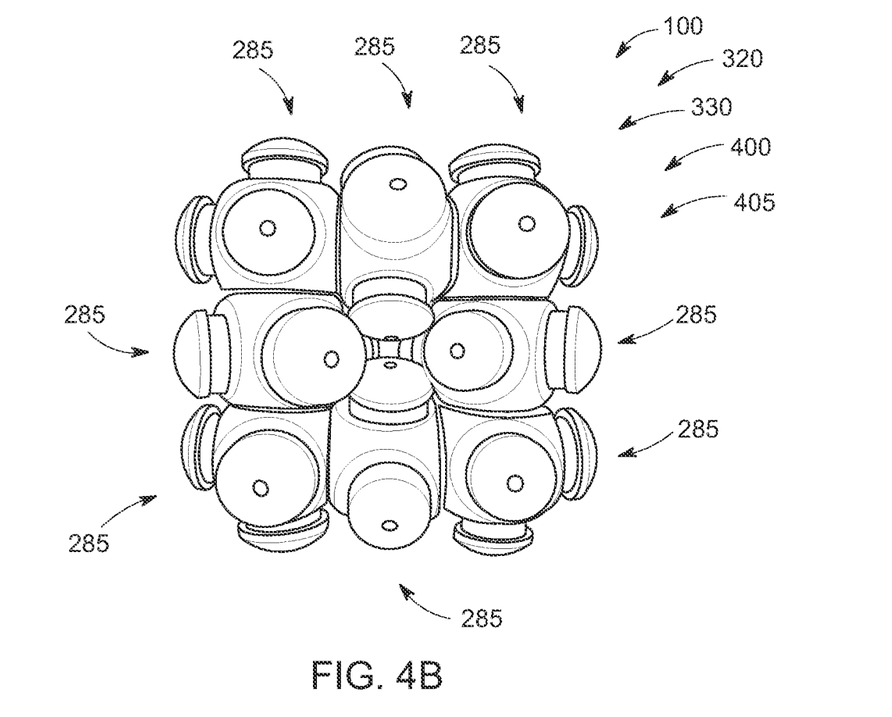
FIG. 4B is a schematic perspective view of the dog toy of FIG. 3A in a fourth configuration.

Still further possible conglomerated forms 320 of blocks 285 are shown in FIGS. 4A and 4B. FIG. 4A shows a conglomerated form 320 of blocks 285 arranged in a multiple axes shape 330 and more specially into a shape 400 where blocks 285 are connected along 4 different axes. In FIG. 4B, the shape 400 includes a shape 405 where the four axes are in the same plane. Additional blocks 285 can be connected to the shape 405 to create a shape with fifth, sixth, etc. axes.

The conglomeration of three or more blocks 285 would provide two or more closed cavities 120,220. Thus, multiple treats can be hidden within the various cavities 120,220. Each of the cavities 120,220 can be closed by the insertion of a protrusion 135,235 into an opening 125,225. The desired separation force can be selected by choosing the protrusion 135,235 that is inserted into the opening 125,225. Thus, a user can choose to provide multiple treats that require the same or a different separation force in order for the dog to access the cavity 120,220 and obtain the treat. For example, a user can try to entertain or pacify a dog for a long period of time by making each connection more difficult to disconnect. Alternatively, the user may select to have multiple connections have the same or similar separation forces and one or more have stronger separation forces, or the like. A conglomeration of four or more blocks 285 would provide three or more closed cavities, etc. In one version, each of the conglomeration of blocks 285 is the same. In another version, one or more of the blocks 285 in the conglomeration is different from another block.

The first component 105, the second component 110, and or the blocks 285 can be in any desirable geometrical shape that allows for an opening 125,225 to be provided on a side of the shape and that allows for one or more protrusions 135,235 to extend from another side of the shape. By block it is meant any three-dimensional geometric shape. For example, the shape can be cuboidal, as shown in FIGS. 2A through 2C, 3B, and 3C. By cuboidal it is meant that the shape has six general discrete sides or faces. The sides or faces may be flat, substantially flat, rounded, convex, and/or concave and may be connected to one another by corners, edges, rounds, or the like. Cuboids include square cuboids where all sides are of substantially equal dimension and rectangular cuboids where one or more of the sides differs in dimension from another on or more of the sides. Alternatively, the shape can be spheroidal with the term side corresponding to a location on the sphere. By spheroidal it is meant any rounded shape that is at least partially rounded and spherical, ovoid, ovate, egg-shaped, and/or the like. Alternatively, the shape can be a pyramid, such as a pyramid have four or more sides, and/or can be any other geometical shape, and/or can have more than six sides. The shape can also be a combination of any of the above shapes.

In the versions shown, the openings 125,225 and protrusions 135,235 are shown as being round or having a circular cross section. In another version, the cross-sectional shapes can be other than round or circular. The relative cross-sectional dimensions of the openings 125,135 and the protrusions 135,235 can be adjusted accordingly.

The dog toy 100 can also include variations from the specific examples provided above. For example, the blocks 285 can each have a different shape from one another and/or can contain different protrusion configurations. In one version, each block 285 can include a differently sized or shaped opening 125,135 to allow for further adjustability of the separation force. For example, the lip 155,255 of the opening 125,225 can be different size or shape, such as by varying the tapering of the lip 155,255 for different openings.

The dog toy 100 thus is made up of at least a pair of components. At least one of the components includes an opening into a cavity and at least one of the components includes one or more protrusions. The pair of components can be the same or different. Third, fourth, fifth, etc. components can also be provided where all are the same, where multiple ones are different, or where each are different from one another. A single component can also be sold or provided as a replacement component or to add an additional component for making larger conglomerations.

Although the present invention has been described in considerable detail with regard to certain preferred versions thereof, other versions are possible, and alterations, permutations and equivalents of the version shown will become apparent to those skilled in the art upon a reading of the specification and study of the drawings. For example, the cooperating components may be reversed or provided in additional or fewer number, and all directional limitations, such as up and down and the like, can be switched, reversed, or changed as long as doing so is not prohibited by the language herein with regard to a particular version of the invention. Also, the various features of the versions herein can be combined in various ways to provide additional versions of the present invention. Furthermore, certain terminology has been used for the purposes of descriptive clarity, and not to limit the present invention. Throughout this specification and any claims appended hereto, unless the context makes it clear otherwise, the term "comprise" and its variations such as "comprises" and "comprising" should be understood to imply the inclusion of a stated element, limitation, or step but not the exclusion of any other elements, limitations, or steps. Throughout this specification and any claims appended hereto, unless the context makes it clear otherwise, the term "consisting of" and "consisting essentially of" and their variations such as "consists" should be understood to imply the inclusion of a stated element, limitation, or step and not the exclusion of any other elements, limitations, or steps or any other non-essential elements, limitations, or steps, respectively. Throughout the specification, any discussed on a combination of elements, limitations, or steps should be understood to include a disclosure of additional elements, limitations, or steps and the disclosure of the exclusion of additional elements, limitations, or steps. All numerical values, unless otherwise made clear in the disclosure or prosecution, include either the exact value or approximations in the vicinity of the stated numerical values, such as for example about +/− ten percent or as would be recognized by a person or ordinary skill in the art in the disclosed context. The same is true for the use of the terms such as about, substantially, and the like. Also, for any numerical ranges given, unless otherwise made clear in the disclosure, during prosecution, or by being explicitly set forth in a claim, the ranges include either the exact range or approximations in the vicinity of the values at one or both of the ends of the range. When multiple ranges are provided, the disclosed ranges are intended to include any combinations of ends of the ranges with one another and including zero and infinity as possible ends of the ranges. Therefore, any appended or later filed claims should not be limited to the description of the preferred versions contained herein and should include all such alterations, permutations, and equivalents as fall within the true spirit and scope of the present invention.

What is claimed is:

1. A dog toy comprising:
a first component having a first component body that defines a first component cavity, the first component body having a first component opening into the first component cavity; and
a second component having a second component body, the second component body comprising a first protrusion and a second protrusion,
wherein each of the first protrusion and the second protrusion is selectively insertable into the first component opening in a manner where it remains within the first component opening to close the first component opening and is removable from the first component opening when a separation force is applied,
whereby a treat can be inserted into the first component cavity, the first component cavity can be closed by insertion of the first protrusion or second protrusion into the first component opening, and a dog can gain access to the treat by separating the first component and the second component, and
wherein the first protrusion comprises a shaft portion and a knob portion, the shaft portion of the first protrusion having a cross-sectional dimension less than a cross-sectional dimension of the knob portion of the first protrusion, wherein the second protrusion comprises a shaft portion and a knob portion, the shaft portion of the second protrusion having a cross-sectional dimension less than a cross-sectional dimension of the knob portion of the second protrusion, wherein the cross-sectional dimension of the shaft portion of the first protrusion is substantially the same as the cross-sectional dimension of the shaft portion of the second protrusion, and wherein the cross-sectional dimension of the knob portion of the first protrusion is different than the cross-sectional dimension of the knob portion of the second protrusion, so that the separation force for the first protrusion is different than the separation force for the second protrusion, and wherein the separation force for the first protrusion is selected to allow the second component to be separated from the first component by a dog.

2. A dog toy according to claim 1, wherein the second component comprises a third protrusion, wherein the third protrusion comprises a shaft portion and a knob portion, the shaft portion having a cross-sectional dimension less than a cross-sectional dimension of the knob portion, wherein the cross-sectional dimension of the shaft portion of the third protrusion is substantially the same as the cross-section dimension of the shaft portion of the first protrusion and the cross-sectional dimension of the shaft portion of the second protrusion, and wherein the cross-sectional dimension of the knob portion of the third protrusion is different than the cross-sectional dimension of the knob portion of the first protrusion and second protrusion.

3. A dog toy according to claim 1, wherein the first protrusion shaft portion has a cross-sectional dimension the same as or less than a cross-sectional dimension of the first component opening and the knob portion has a cross-sectional dimension larger than the cross-sectional dimension of the first component opening.

4. A dog toy according to claim 1, wherein the first component comprises a first protrusion and a second protrusion, the first protrusion of the first component comprising a shaft portion and a knob portion, the shaft portion of the first protrusion of the first component having a cross-sectional dimension less than a cross-sectional dimension of the knob portion of the first protrusion of the first component, wherein the second protrusion of the first component comprises a shaft portion and a knob portion, the shaft portion of the second protrusion of the first component having a cross-sectional dimension less than a cross-sectional dimension of the knob portion of the second protrusion of the first component, and wherein the cross-sectional dimension of the knob portion of the first protrusion of the first component is different than the cross-sectional dimension of the knob portion of the second protrusion of the first component.

5. A dog toy according to claim 1, wherein the first protrusion comprises a lip between the shaft portion and the knob portion, the lip being adapted to contact a rim of the first component opening in the cavity.

6. A dog toy according to claim 1, wherein the knob portion of the first protrusion comprises a tapered forward surface.

7. A dog toy according to claim 1, wherein each of the first protrusion and the second protrusion are provided with an indicia indicating the different separation forces.

8. A dog toy according to claim 1, wherein the second component has a second component cavity and a second component opening into the second component cavity, and wherein the first component comprises one or more protrusions each insertable into the second component opening to close the second component cavity.

9. A dog toy according to claim 1, wherein the first and second components each have an opening, a first protrusion, and a second protrusion and the opening, first protrusion, and second protrusion of the first component are each substantially the same size and shape as the opening, first protrusion, and second protrusion of the second component.

10. A dog toy according to claim 1, wherein the first and second components are different in size or shape.

11. A dog toy according to claim 1, further comprises a third component, the third component having a cavity and opening into the cavity or one or more protrusions.

12. A dog toy according to claim 1, wherein the first component has a plurality of faces, wherein the first component opening is provided on one of the faces, wherein the second component has a plurality of faces, and wherein the first protrusion is provided on one of the faces of the second component and the second protrusion is provided on another face of the second component.

13. A dog toy according to claim 1, wherein the first component and the second component are cuboidal and have six faces, wherein the opening is provided on one of the faces of the first component.

14. A method of providing a dog with a treat, the method comprising:
providing a first component having a first component body that defines a first component cavity, the first component body having a first component opening into the first component cavity;
providing a second component having a second component body, the second component body comprising a first protrusion and a second protrusion, wherein each of the first protrusion and the second protrusion is selectively insertable into the first component opening in a manner where it remains within the first component opening to close the first component opening and being removable from the first component opening when a separation force is applied, wherein the separation force for the first protrusion is different than the separation force for the second protrusion, when each is fully inserted;
inserting a treat into the first component cavity;
selecting either then first protrusion or the second protrusion based on a desired relative separation force; and
inserting the selected first protrusion or second protrusion into the first component opening to close the first component cavity and retain the treat therein until a separation force is achieved,
wherein the first protrusion comprises a shaft portion and a knob portion, the shaft portion of the first protrusion having a cross-sectional dimension less than a cross-sectional dimension of the knob portion of the first protrusion, wherein the second protrusion comprises a shaft portion and a knob portion, the shaft portion of the second protrusion having a cross-sectional dimension less than a cross-sectional dimension of the knob portion of the second protrusion, and wherein the cross-sectional dimension of the knob portion of the first protrusion is different than the cross-sectional dimension of the knob portion of the second protrusion, and wherein the separation force for the first protrusion is selected to allow the second component to be separated from the first component by a dog.

15. A method according to claim 14, wherein the second component has a second component cavity and a second component opening into the second component cavity, the method further comprising:
providing a third component having a first protrusion and a second protrusion;
inserting a treat into the second component cavity; and
closing the second component cavity by inserting the first protrusion or second protrusion of the third component into the second component opening.

16. A method according to claim 14, wherein the cross-sectional dimension of the shaft portion of the first protrusion is substantially the same as the cross-sectional dimension of the shaft portion of the second protrusion.

17. A dog toy comprising:
a first component having a first component cuboidal body having six faces, the first component cuboidal body defining a first component cavity, the first component cuboidal body having a first component opening into the first component cavity on one of the faces, the first component cuboidal body also having a first protrusion extending from one of the faces, a second protrusion extending from another one of the faces, and a third protrusion extending from another one of the faces; and
a second component having a second component cuboidal body having six faces, the second component cuboidal body defining a second component cavity, the second component cuboidal body having a second component opening into the second component cavity on one of the faces, the second component cuboidal body also having a first protrusion extending from one of the faces, a second protrusion extending from another one of the faces, and a third protrusion extending from another one of the faces; and wherein each of the first protrusion, the second protrusion, and the third protrusion of the first component is selectively insertable into the second component opening in a manner where it remains within the second component opening to close the second component opening and is removable from the second component opening when a separation force is applied, wherein the separation force for each protrusion is different when the protrusions are fully inserted into the second component opening, and wherein each separation forces is selected to provide a different challenge for a dog trying to separate the components,
wherein each of the first protrusion, the second protrusion, and the third protrusion of the second component is selectively insertable into the first component opening in a manner where it remains within the first component opening to close the first component opening and is removable from the first component opening when a separation force is applied, wherein the separation force for each protrusion is different when the protrusions are fully inserted into the first component opening, and wherein each separation forces is selected to provide a different challenge for a dog trying to separate the components,
whereby a treat can be inserted into the first component cavity or the second component cavity, the cavity into which the treat is inserted can be closed by insertion of the first protrusion, second protrusion, or third protrusion of other component into the opening into the cavity into which the treat is inserted, and a dog can gain access to the treat by separating the first component and the second component.

18. A dog toy according to claim 17, wherein the first protrusion on the first component comprises a shaft portion and a knob portion, the shaft portion of the first protrusion having a cross-sectional dimension less than a cross-sectional dimension of the knob portion of the first protrusion, wherein the second protrusion on the first component comprises a shaft portion and a knob portion, the shaft portion of the second protrusion having a cross-sectional dimension less than a cross-sectional dimension of the knob portion of the second protrusion, wherein the third protrusion on the first component comprises a shaft portion and a knob portion, the shaft portion of the third protrusion having a cross-sectional dimension less than a cross-sectional dimension of the knob portion of the third protrusion, wherein the cross-sectional dimension of the shaft portion of the first protrusion is substantially the same as the cross-sectional dimension of the shaft portion of the second protrusion and the third protrusion, and wherein the cross-sectional dimension of the knob portion of the first protrusion, the cross-sectional dimension of the knob portion of the second protrusion, and the cross-sectional dimension of the knob portion of the third protrusion are each different so that the separation force for the first protrusion is different than the separation force for the second protrusion and different than the separation force for the third protrusion.

19. A dog toy according to claim 17, wherein the first component and the second component are substantially the same.

20. A dog toy according to claim 17, wherein the first component cuboidal body has a fourth protrusion extending from another one of the faces and a fifth protrusion extending from another one of the faces, wherein the second component cuboidal body has a fourth protrusion extending from another one of the faces and a fifth protrusion extending from another one of the faces, wherein the separation force for each protrusion of the first component is different when the protrusions are fully inserted into the second component opening and wherein each protrusion of the first component is provide with an indicia indicating the separation force, and wherein the separation force for each protrusion of the second component is different when the protrusions are fully inserted into the first component opening and wherein each protrusion of the first component is provide with an indicia indicating the separation force.

\* \* \* \* \*